(12) United States Patent
Mastrianni et al.

(10) Patent No.: US 7,584,266 B2
(45) Date of Patent: Sep. 1, 2009

(54) AUTONOMOUS STORAGE FOR BACKUP, RESTORE, AND FILE ACCESS

(75) Inventors: Steven J. Mastrianni, Unionville, CT (US); James Rubas, Yorktown Heights, NY (US); Ajay Mohindra, Yorktown Heights, NY (US); Thomas F. Chefalas, Somers, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 10/736,802

(22) Filed: Dec. 16, 2003

(65) Prior Publication Data

US 2005/0131996 A1 Jun. 16, 2005

(51) Int. Cl.
*G06F 15/16* (2006.01)
*G06F 15/167* (2006.01)
*G06F 12/00* (2006.01)

(52) U.S. Cl. .................. 709/218; 709/203; 709/213; 709/214; 709/215; 709/216; 709/248; 707/200; 707/204

(58) Field of Classification Search ......... 709/217–219, 709/203, 248, 213–216; 707/204, 200
See application file for complete search history.

(56) References Cited

U.S. PATENT DOCUMENTS 5,276,865 A * 1/1994 Thorpe .................. 714/24
5,798,951 A * 8/1998 Cho et al. ............... 710/303
RE37,038 E * 1/2001 Eastridge et al. ........... 714/5
6,742,023 B1 * 5/2004 Fanning et al. ........... 709/219
6,892,288 B2 * 5/2005 Serichol Blasco ......... 711/161
2002/0163780 A1 * 11/2002 Christopher .............. 361/686
2004/0010666 A1 * 1/2004 Umbehocker et al. ..... 711/156
2004/0073681 A1 * 4/2004 Fald ...................... 709/227
2004/0123057 A1 * 6/2004 Freudenschuss et al. ... 711/162
2004/0125782 A1 * 7/2004 Chang .................... 370/338
2004/0193955 A1 * 9/2004 Leete et al. ............... 714/22
2005/0086241 A1 * 4/2005 Ram et al. ................ 707/100

FOREIGN PATENT DOCUMENTS

WO WO 03001378 * 1/2003

* cited by examiner

*Primary Examiner*—Nathan J Flynn
*Assistant Examiner*—Joshua Joo
(74) *Attorney, Agent, or Firm*—Louis J. Percello; David Aker (57) ABSTRACT

A method, apparatus and computer product that, in a system having a client computer, and apparatus for connecting the client computer to a network having a server for backing up the client computer, enables transferring data from the client computer to the server, by connecting the client computer to the network; backing up data on the client computer to a storage device attached to the network when the client computer is connected to the network; and transferring the data from the storage device to the server, preferably at a time determined by the server.

30 Claims, 4 Drawing Sheets

AUTONOMOUS STORAGE FOR BACKUP, RESTORE, AND FILE ACCESS

FIELD OF THE INVENTION

The present invention relates to methods and apparatus to provide secure autonomous storage for backup, restore, and file access.

BACKGROUND OF THE INVENTION

There is a considerable amount of prior art in the of field of backup and restore systems. Several well-known backup and restore systems are currently marketed by companies such as Veritas and IBM. These systems provide reliable, secure backup and restore capabilities by utilizing a server that contacts each registered client in turn to request to a backup session. The client system generally has an agent installed that communicates with the backup server, and together the backup server and client agent negotiate a mutually acceptable arrangement for performing the backup. The server might contact the client and tell the client that it will be available in the next half hour to perform a backup of the client, and ask if the client can agree to that schedule. If so, the client waits to be contacted by the server and makes preparations for the backup if required.

These backup systems usually require a server and one or more clients. The server oversees the operation and provides the storage for the backed up files. In general, the clients are polled to provide their backup data to ensure that the server has the capacity to perform the backup at the specified time, with backup performed at the convenience of the server, and not the client(s). In order to complete the backup, however, the client system must be connected to the network at the same time the backup server is available or the backup cannot be completed.

For traveling users, getting their system backed up can be a chore. In order to get backed up, the client system must be on the network until contacted by the backup server. It is likely that a traveling user's system will never be connected at the very moment that the server gets around to backing it up.

SUMMARY OF THE INVENTION

It is therefore an aspect of the present invention to provide for secure and automatic backup of client data even if the client system is not always connected to the network or the backup server.

It is another object of the invention to provide such backup in a manner that is virtually transparent to the user.

The present invention provides for the on-demand backup of the client system programs and data by using a storage device and storage management software which is preferably located in the client system's docking station. However, although this invention is described herein as being located in a local docking station device, the storage portion of the invention can be located anywhere in the network provided that it is accessible from both the client system and the server.

The invention, is directed to a method, a system and a computer program product (software) for implementing the method and system. For example, in a system having a client computer, and apparatus for connecting the client computer to a network having a server for backing up the client computer, the invention is directed to a method for transferring data from the client computer to the server, comprising connecting the client computer to the network; backing up data on the client computer to a storage device attached to the network when the client computer is connected to the network; and transferring the data from the storage device to the server. The transferring of the data from the storage device to the server occurs at a time determined by the server. The connecting may comprise connecting the client computer to a docking station connected to the network. The storage device may be associated with the docking station.

The method may further comprise connecting the client computer to the network a plurality of times before the server backs up the data on the client computer, and creating a new data set on the storage device for transfer to the server each time the client computer is connected to the network. The data sets are transferred to the server in the order in which the data sets were created.

The connecting may comprise establishing a data transfer link between the client computer and the data storage device. The data transfer link may comprise one of a wireless link and an infrared link.

If the client computer is off when connected to the network, the method further comprises powering up a storage device in the client computer; and transferring data stored on the storage device in the client computer to the storage device attached to the network. If power to the client computer is turned on during transfer of data stored on the storage device in the client computer to the storage device attached to the network, the transfer of data is suspended while the client computer boots up. If the client computer is initially on when connected to the network, but the client computer is turned off, the method further comprises suspending transferring data stored on a storage device in the client computer to the storage device attached to the network, to permit normal backup of files on the client computer. If the client computer is disconnected from the network during a first backing up of data on the client computer to a storage device attached to the network, and the client computer is again connected to the network, the client computer is backed up to the storage device on the network a second time, and data is sequentially transferred in the following order: first data transferred to the storage device before the client was disconnected from the network, and then data transferred to the storage device during the second time.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Variations described for the present invention can be realized in any combination desirable for each particular application. Thus particular limitations, and/or embodiment enhancements described herein, which may have particular advantages to the particular application need not be used for all applications. Also, it should be realized that not all limitations need be implemented in methods, systems and/or apparatus including one or more concepts of the present invention.

Figure 1:
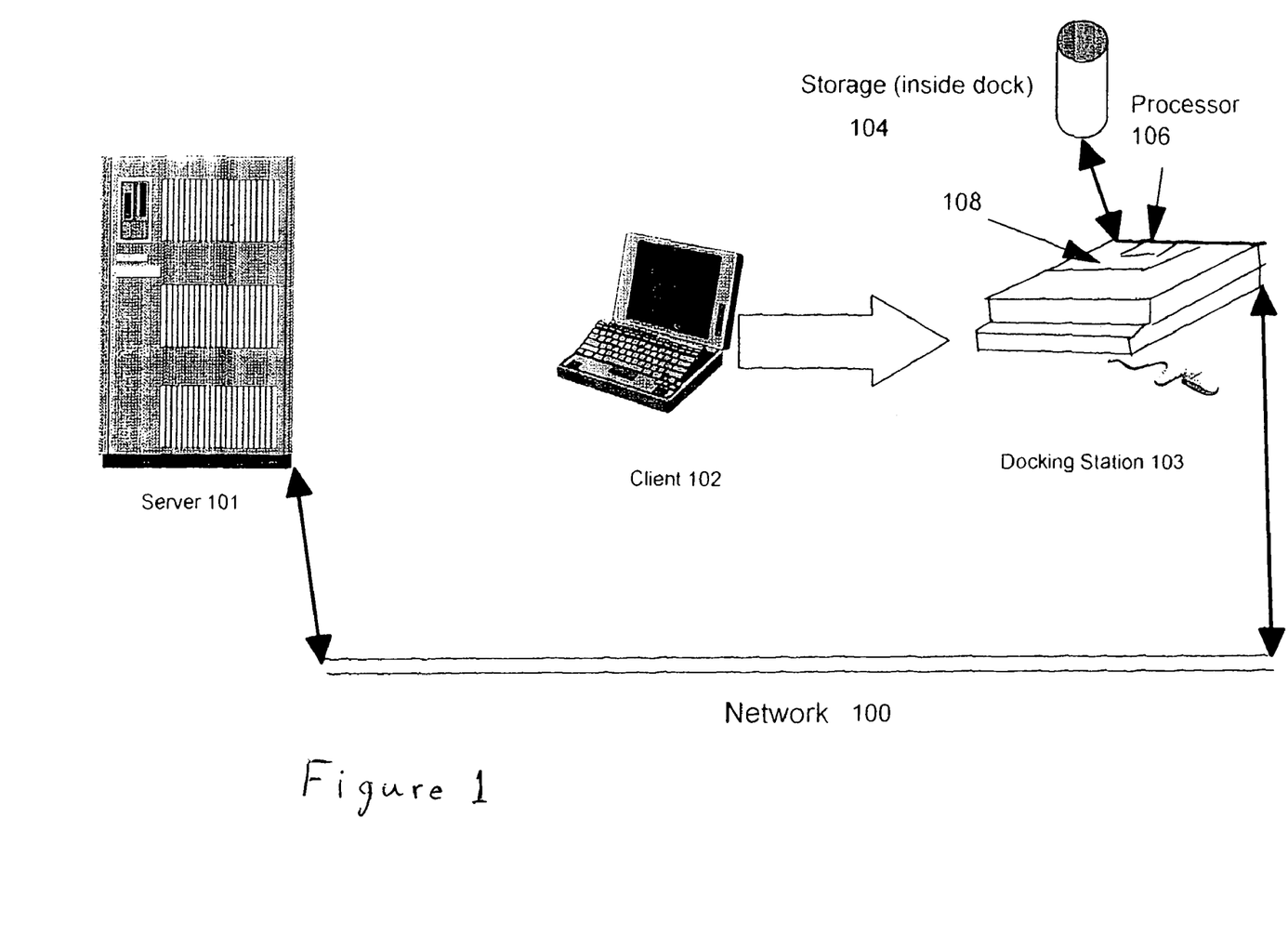
FIG. 1 is a block diagram of a system in accordance with the present invention.

Referring to FIG. 1, in a computer network 100, many computer users utilize the same computer (shown as client system 102) at the office as they do when traveling. This is made easier by devices called docking stations 103. A docking station is a unit that contains connectors, plugs, and jacks necessary to hook the client system 102 up to the network 100 (and optionally to a server 101), a separate monitor (not shown), a mouse 106, a separate keyboard (not shown), and other devices. These devices plug directly into the docking station 103, and the client system 102 snaps into the docking station. The docking station 103 connects the client system 102 electrically to the proper devices and connectors attached to the docking station 103. The client system 102 usually connects to the docking station through some type of recessed connector that is exposed only when the client system 102 is plugged into the docking station. Those skilled in the art can appreciate that there are many ways that a client system can be connected to a docking station. A recessed connector is cited herein as an example of how some docking stations are constructed. Using a release button or release mechanism on the docking station 103, the client system 102 can be removed from the network 100 and external devices by simply lifting it from the docking station 103. Thus, the user is not required to remove plugs and jacks from the client system 102 to disconnect it from external devices or the network 100.

Traveling users come and go from the office environment. They may visit the office in the morning or in the evening to replicate mail, calendar, and other information. Often, once the requested data transfer has been completed, they remove the client system 102 from the docking station 103 and leave to visit customers. In this scenario, however, the client system 102 often never gets properly backed up. The chance that the client system 102 is connected to the network at the very time the backup server 101 needs to do a backup is very slim. For this reason, it is better to do backup "on demand" when the customer needs it, at the convenience of the client, not at the convenience of the server as is done in current backup products.

In accordance with the invention, in the docking station 103, a small interface board 106, having a small processor 108, and a disk drive or other storage device 104 are installed, although in practice, these components may be installed anywhere on the network. The storage device 104 also may be a flash memory, an internal disk drive, an external disk drive, a storage card, or any other device capable of storing digital data. In one implementation of the present invention, the storage may also exist on the network interface adapter.

When the user places the client system 102 on the docking station, the action of attaching or connecting the client system 102 to the docking station 103, causes the storage device 104 to wake up and do an immediate backup of the client system 102. The storage device 104 may be powered from an external source, but may also be powered from the internal power supply (typically a battery) of the client system 102.

While the invention has been described above with respect to placing the client computer 102 in the docking station 103 in order to transfer data, the invention does not require an actual physical coupling, and a docking station need not be used. Data may be transferred by wireless connection (including a short range link), infrared link, or any other means, form a client computer to a back up storage device on a network capable of storing data until it is backed up by a server. Preferable, the connection between the client computer and the backup device uses some type of encryption or other security means to ensure that the data remains confidential.

Figure 2:
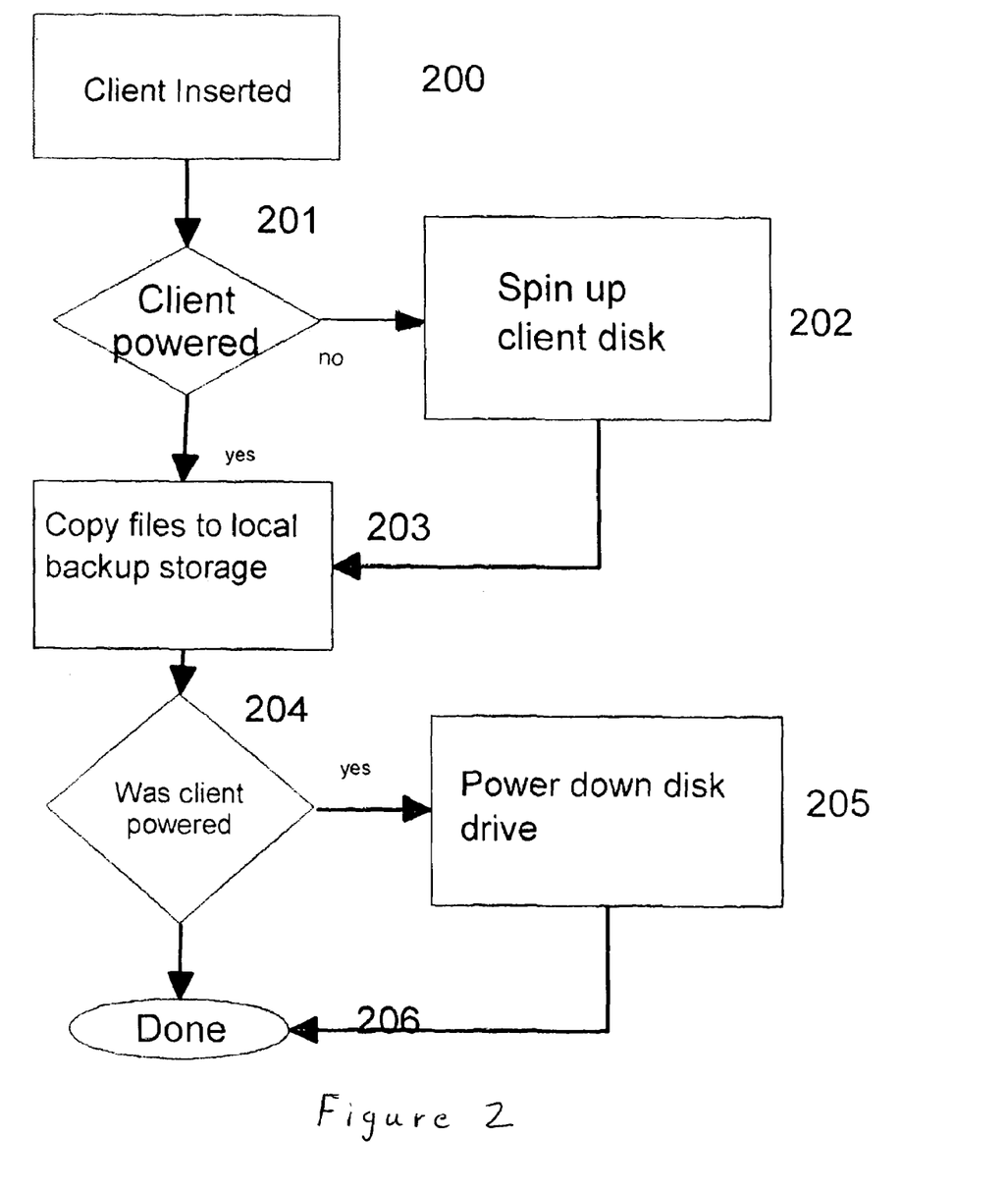
FIG. 2 is a flow chart of a data back up process when the client is connected to network.

Referring also to FIG. 2, if the client system 102 is off when the user places it on the docking station 103 (step 200 of FIG. 2), the processor device and associated hardware of the present invention cause the disk drive (not specifically shown) of the client system 102 to power up 202, utilizing either the power from the docking station 103 or from the battery of the client system 102. The interface board of the present invention 106 then commences to facilitate a very fast copy from the client system 102 to the storage unit 104 located in the docking station 103 (step 203 of FIG. 2) or some other location in the network.

If the client system 102 is already powered on, the interface board 106 commences to facilitate a very fast copy 203 from the client system 102 to the storage unit 104 located in the docking station or in some other location in the network.

In accordance with the invention, if the client system 102 was powered down, the disk drive of the client system is turned off once again at 205.

If power to the client system 102 is shut off during a backup operation, the software of the present invention continues autonomous backup of the client files at 203 using the interface board 106 in the docking station 103.

The data from the client system 102 is backed up to the storage device 104, and the user can continue to use the system normally while the backup is running. The docking station 103, which is almost always attached to the network, can now respond to the backup server 101 at any time, day or night, and it does not matter whether or not the client system 102 is powered on. The backup server 101 instead communicates directly with the processing interface board 106 and the storage device 104 in the docking station 103, and can now be backed up at the normal server schedule. When communicating with the docking station 103, the backup server 101 operates as if it were communicating directly with the client system 102, and has no indication that it is instead communicating with the docking station 103.

It is important to note that two distinct backups take place using the present invention. The first backup is the backup that takes place between the client system 102 and the processor and storage of the present invention. The second backup takes place between the server and the docking station.

If the docking station contains no data (the client has never been backed up) a backup is first done from the client to the storage device and processor of the present invention, then the normal backup done between the server and the docking station. As far as the server is concerned, it is doing a normal backup to the client, when in reality, it is actually doing a backup of the storage of the present invention.

It is possible that in certain circumstances the connection of the client computer to the network may be interrupted during local backup of the client computer to the storage device associated with the docking station. While a fast copy routine will tend to minimize the likelihood of this happening, there are several measures that may be taken to deal with this possibility. In a first case, the user of the client computer may be prompted with a display indicating that backup is taking place, and that the client computer is to remain connected to the network through the docking station or any other connection being used. In a second case, transfer to the local storage device is suspended as soon as the connection is broken, but a partial data set is saved on the local storage device. Then, when the client computer is again connected to the network, a full data set is saved. When the server is connected for backup to the server, the partial data set and then the full data set are sequentially backed up to the server, in a manner similar to that described above. A specific approach is set forth below.

Figures 3A, 3B:
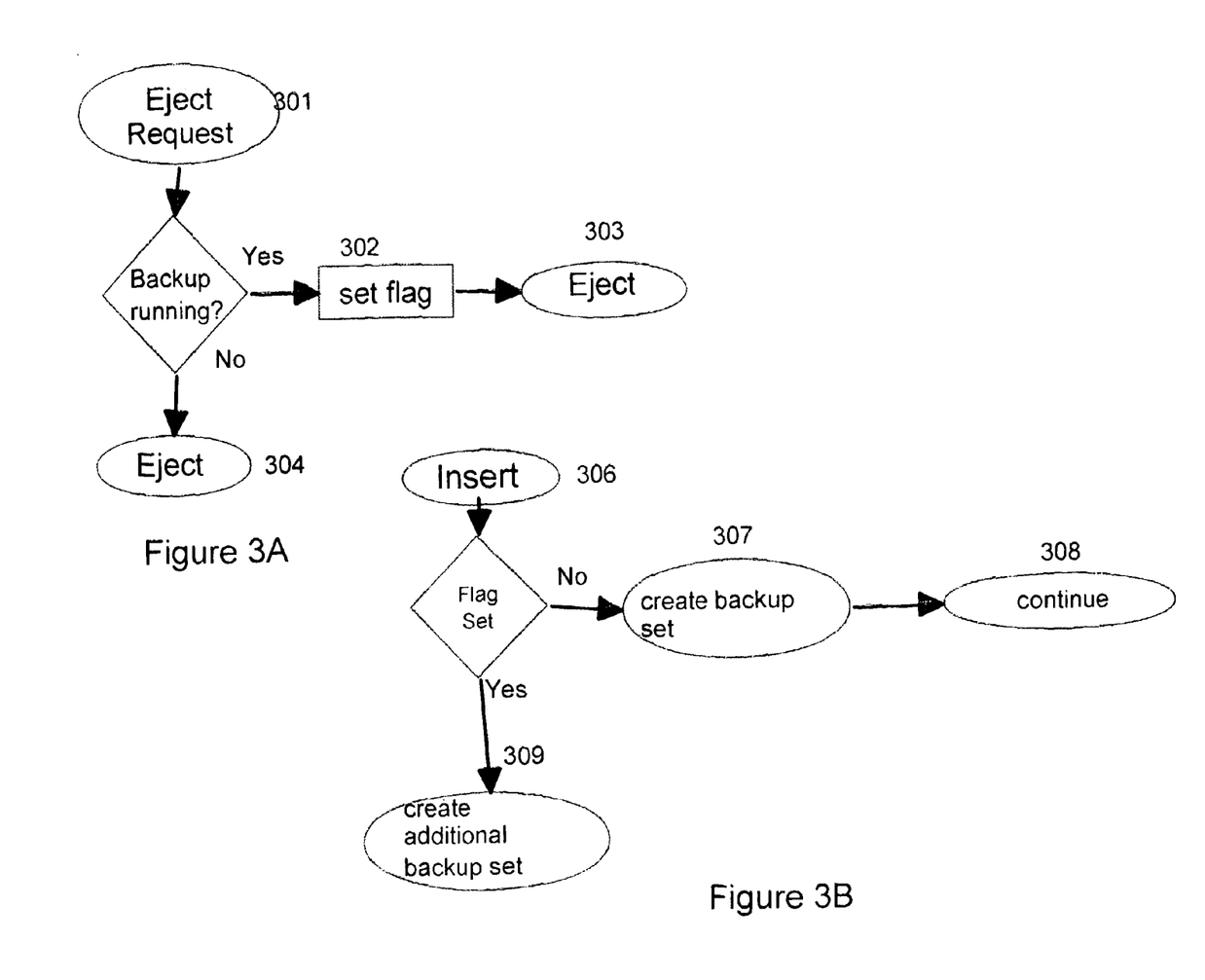
FIG. 3A and FIG. 3b are flow charts of the data backup operation for multiple connections of the client to the network.

FIG. 3A and FIG. 3B deal with the situation in which the client system 102 is placed in the docking station 103 (or connected to the docking station by a data link), but is removed from the docking station 103 (or the data link is severed) and then inserted again before local backup has been completed. Referring to FIG. 3A, if the client computer is removed, a reject request 301 is generated. If a local backup operation is being conducted, a flag is set at 302, and the client computer is ejected (removed) from the docking system at 303. If there is no backup running, the removal or ejection takes place at 304, without setting the flag.

Referring to FIG. 3B, when the client computer 102 is again inserted into the docking station, or a data link is reestablished at 306, the state of the flag is checked. If the flag was not set, local backup is performed at 307 to create a backup data set in the storage device 104 associated with the docking station. Normal operation continue 308. If the flag was set, a new backup data set is created at 309. There are now at least two backup data sets, depending on the number of times that the client computer 102 is connected to the docking station 103 before data is backed up to the server 101.

Figure 4:
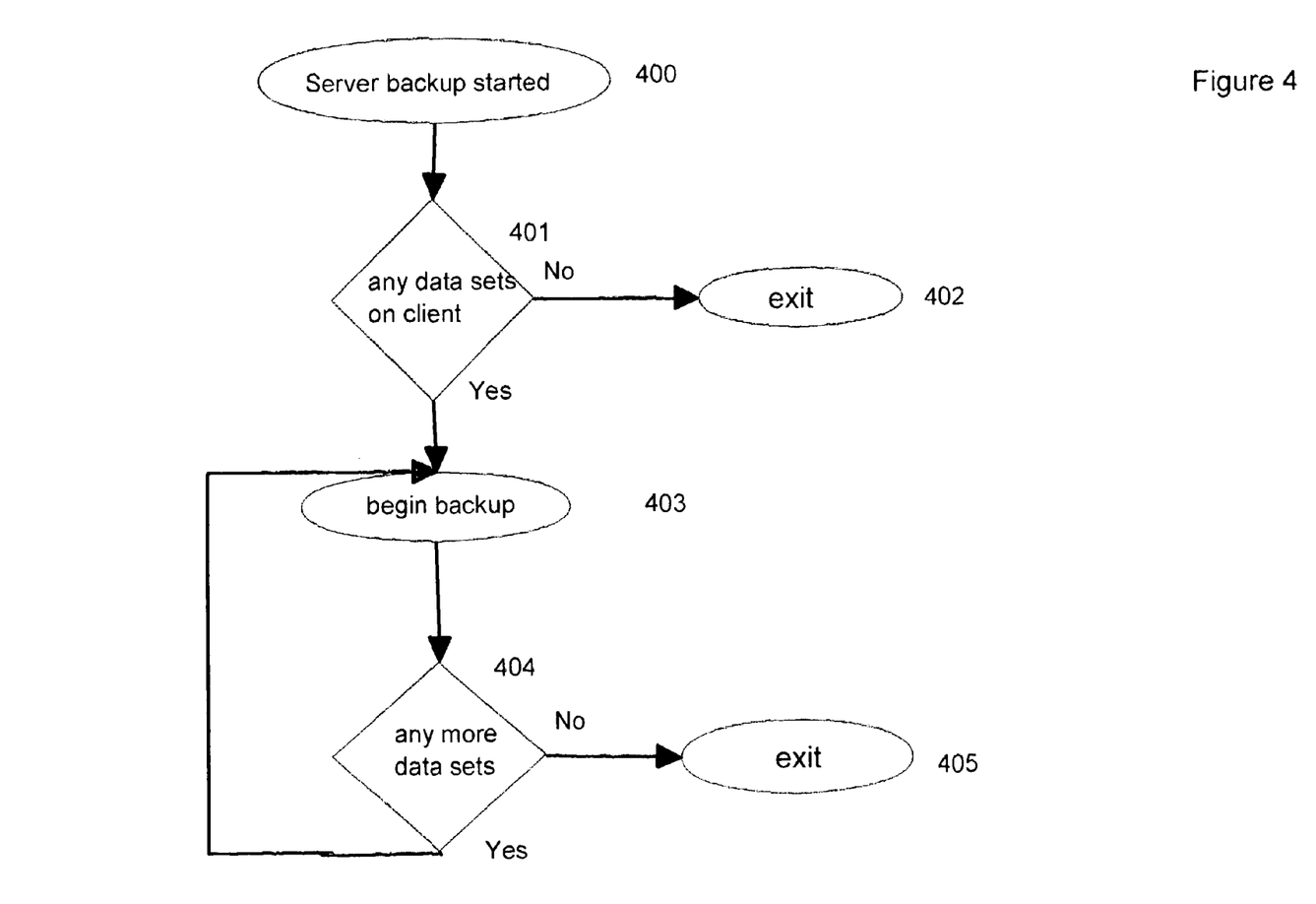
FIG. 4 is a flow chart of backup to a server.

Referring to FIG. 4, eventually, perhaps on some predetermined schedule, such as during early morning hours, when a great deal of network traffic is not expected, the server is connected to the docking station, and backup to the server starts at 400. At 401, a determination is made as to whether there are any data set to back up. If there are none, the backup operation to the server is terminated at 402. If there are data set to back up, the oldest (the data set generated first) is backed up to the server at 403. At 404, a determination is made as to whether there are any additional data set to back up. If there are, then operations return to 403 and the next data set is backed up to the server. When all data set have been backed up, as determined at 404, backup operations to the server are terminated, at 405.

The present invention may also be used to facilitate file sharing or distribution. If a file on a client is placed on a server, it may be made available for general distribution to other users of the server, after being backed up to the server as data. Thus, files on the server, whatever their source can also be downloaded to selected clients, or to all clients, as an adjunct to the backup processes described above.

The present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

Having thus described our invention, what we claim as new and desire to secure by Letters Patent is as follows:

1. In a system having a client computer, and apparatus for connecting said client computer to a network having a server for backing up said client computer, a method for transferring data from said client computer to said server, comprising:
   connecting said client computer to said network;
   backing up data on said client computer to a storage device attached to said network when said client computer is connected to said network; and
   transferring the data from said storage device to said server to back up and retain said data on said server;
   wherein if said client computer is off when connected to said network, the method further comprises:
   powering up a storage device in said client computer; and
   transferring data stored on said storage device in said client computer to said storage device attached to said network; and
   if power to said client computer is turned on during transfer of data stored on said storage device in said client computer to said storage device attached to said network, said transfer of data is suspended while said client computer boots.

2. A method as recited in claim 1, wherein said transferring of said data from said storage device to said server occurs at a time determined by said server.

3. A method as recited in claim 1, wherein said connecting comprises connecting said client computer to a docking station connected to said network.

4. A method as recited in claim 3, wherein the storage device is associated with said docking station.

5. A method as recited in claim 1, further comprising: connecting said client computer to said network a plurality of times before said server backs up said data on said client computer, and creating a new data set on said storage device for transfer to said server each time said client computer is connected to said network so as to create data sets.

6. A method as recited in claim 5, wherein said data sets are transferred to said server in an order in which said data sets were created.

7. A method as recited in claim 1, wherein said connecting comprises establishing a data transfer link between said client computer and said data storage device.

8. A method as recited in claim 7, wherein said data transfer link comprises a wireless link or an infrared link.

9. A method as recited in claim 1, wherein if said client computer is initially on when connected to said network, but said client computer is turned off, the method further comprises suspending transferring data stored on a storage device in said client computer to said storage device attached to said network, to permit normal backup of files on said client computer.

10. A method as recited in claim 1, wherein if said client computer is disconnected from said network during a first backing up of data on said client computer to a storage device attached to said network, and said client computer is again connected to said network, the method further comprises backing up said client computer to said storage device on said network a second time, and transferring sequentially to said server data transferred to said storage device before said client was disconnected from said network, and then data transferred to said storage device during said second time.

11. A system for backing up data on a client computer to a server on a network, said system comprising:

connection apparatus for connecting said client computer to said network;

a storage device connected to said network for backing up data from said client computer when said client computer is connected to said network, said storage device being configured to transfer said data to said server at a time determined by said server to back up and retain said data on said server;

means for powering up a storage device in said client computer if said client computer is off when connected to said network; and means for suspending transfer of data that is stored on storage device in said client computer to said storage device attached to said network, while said client computer boots up, if power to said client computer is turned on during the transfer of data stored on said storage device in said client computer to said storage device attached to said network.

12. A system as recited in claim 11, wherein said connection apparatus is a docking station for said client computer.

13. A system as recited in claim 12, wherein said storage device is associated with said docking station.

14. A system as recited in claim 11, further comprising an interface between said connection apparatus and said storage device, said interface having a processor to facilitate transfer of data.

15. A system as recited in claim 11, wherein said client computer may be connected to said network multiple times before data is transferred to said server, said system further comprising:

means for creating a new data set on said storage device for transfer to said server each time said client computer is connected to said network so as to create data sets.

16. A system as recited in claim 15, further comprising means for transferring said data sets to said server in an order in which said data sets were created.

17. A system as recited in claim 11, wherein said connection apparatus comprises a data transfer link between said client computer and said data storage device.

18. A system as recited in claim 17, wherein said data transfer link comprises a wireless link or an infrared link.

19. A system as recited in claim 11, further comprising means for suspending normal backup of files on said client computer while transferring data stored on a storage device in said client computer to said storage device attached to said network if said client computer is initially on when connected to said network, but said client computer is turned off.

20. A system as recited in claim 11, wherein if said client computer is disconnected from said network during a first backing up of data on said client computer to a storage device attached to said network, and said client computer is again connected to said network, the system further comprises means for backing up said client computer to said storage device on said network a second time, and means for transferring sequentially to said server data transferred to said storage device before said client was disconnected from said network, and then data transferred to said storage device during said second time.

21. A computer usable medium having computer readable program code means embodied thereon, the computer readable program code means being for use in a system having a client computer, and apparatus for connecting said client computer to a network having a server for backing up said client computer, the computer readable program code means being for causing a computer to effect a method for transferring data from said client computer to said server, the method comprising:

connecting said client computer to said network;

backing up data on said client computer to a storage device attached to said network when said client computer is connected to said network; and transferring the data from said storage device to said server to back up and retain said data on said server;

wherein if said client computer is off when connected to said network, the method further comprises:

powering up a storage device in said client computer; and transferring data stored on said storage device in said client computer to said storage device attached to said network; and if power to said client computer is turned on during transfer of data stored on said storage device in said client computer to said storage device attached to said network, said transfer of data is suspended while said client computer boots up.

22. A computer usable medium as recited in claim 21, wherein in the method, said transferring of said data from said storage device to said server occurs at a time determined by said server.

23. A computer usable medium as recited in claim 21, wherein in the method, said connecting comprises connecting said client computer to a docking station connected to said network.

24. A computer usable medium as recited in claim 23, wherein in the method, the storage device is associated with said docking station.

25. A computer usable medium as recited in claim 21, wherein the method further comprises:

connecting said client computer to said network a plurality of times before said server backs up said data on said client computer, and creating a new data set on said storage device for transfer to said server each time said client computer is connected to said network so as to create data sets.

26. A computer usable medium as recited in claim 21, wherein in the method, data sets of backup data are transferred to said server in an order in which said data set were created.

27. A computer usable medium as recited in claim 21, wherein in the method, said connecting comprises establishing a data transfer link between said client computer and said data storage device.

28. A computer usable medium as recited in claim 27, wherein in the method, said data transfer link comprises a wireless link or an infrared link.

29. A computer usable medium as recited in claim 21, further comprising computer readable code means so that in the method, if said client computer is initially on when connected to said network, but said client computer is turned off, the method further comprising suspending normal backup of files on said client computer while transferring data stored on a storage device in said client computer to said storage device attached to said network.

30. A computer usable medium as recited in claim 21, further comprising computer readable code means so that in the method, if said client computer is disconnected from said network during a first backing up of data on said client computer to a storage device attached to said network, and said client computer is again connected to said network, the method further comprises backing up said client computer to said storage device on said network a second time, and transferring sequentially to said server data transferred to said storage device before said client was disconnected from said network, and then data transferred to said storage device during said second time.

* * * * *

UNITED STATES PATENT AND TRADEMARK OFFICE
CERTIFICATE OF CORRECTION

PATENT NO.        : 7,584,266 B2
APPLICATION NO.   : 10/736802
DATED             : September 1, 2009
INVENTOR(S)       : Mastrianni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this

Fourteenth Day of September, 2010

David J. Kappos
*Director of the United States Patent and Trademark Office*